US006259686B1

United States Patent
Blanc et al.

(10) Patent No.: US 6,259,686 B1
(45) Date of Patent: Jul. 10, 2001

(54) MULTIPLE ACCESS METHOD IN A CELLULAR RADIO COMMUNICATION NETWORK

(75) Inventors: Patrick Blanc, Issy les Moulineaux; Anne-Gäele Acx, Paris, both of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/124,661

(22) Filed: Jul. 29, 1998

(30) Foreign Application Priority Data

Aug. 1, 1997 (FR) .................................................. 97 09881

(51) Int. Cl.$^7$ .................................................. H04B 7/212
(52) U.S. Cl. ........................................... 370/337; 370/310
(58) Field of Search .................................... 370/310, 375, 370/330, 342, 343, 206, 347, 332, 331, 337; 375/145, 170, 132, 133; 455/422, 450

(56) References Cited

U.S. PATENT DOCUMENTS

| 5,210,771 | * | 5/1993 | Schaeffer | 370/330 |
|---|---|---|---|---|
| 5,295,153 | * | 3/1994 | Gudmunson | 370/335 |
| 5,533,013 | * | 7/1996 | Leppanen | 370/342 |
| 5,608,727 | | 3/1997 | Perreault et al. | |
| 5,790,549 | * | 8/1998 | Dent | 370/320 |
| 5,931,964 | * | 8/1999 | Beming | 370/331 |
| 6,018,520 | * | 1/2000 | Gitlin | 370/436 |
| 6,091,760 | * | 7/2000 | Giallorenzi | 370/208 |
| 6,173,006 | * | 1/2001 | Kent | 375/145 |

FOREIGN PATENT DOCUMENTS 0 680 168   11/1995 (EP) .
0 719 062   6/1996 (EP) .

OTHER PUBLICATIONS

M. Frullone et al, <<Dynamic Channel Allocation for ATDMA >>, Mario Frullone, et al., Race Summit, Lisbon, Nov. 1995, pp. 299–303.

Tero Ojanperä et al, <<Comparison of Multiple Access Schemes for UMTS>>, Proc. Of the VTC'97 Conference, Phoenix, May 1997, vol. 2, pp. 490–495.

French Preliminary Search Report dated May 20, 1998, French Appl. No. FR 9709881.

* cited by examiner

Primary Examiner—Douglas Olms
Assistant Examiner—Ricardo M. Pizarro
(74) Attorney, Agent, or Firm—Marshall, O'Toole, Gerstein, Murray & Borun

(57) ABSTRACT

The network allows communications at various bit rates, with signals transmitted in successive frames each divided into elementary timeslots which can be used for different communications. A frequency band is allocated to communications between base stations of a group of cells and mobile stations. This band is subdivided into blocks of width $2^{M-1} \times B_0$, where $B_0$ is a predefined spectral width and M an integer greater than 1 chosen as a function of a maximum communication bit rate. Each of the blocks is divided into carriers of width $2^{m(i)-1} \times B_0$, m(i) being an integer dependent on the relevant block such that $1 \leq m(i) \leq M$. The partition of the blocks and of the carriers within the allocated frequency band is identical for all the cells of the group. To support a communication in one of the cells, a logic channel is selected, defined, depending on the bit rate required, as one or more timeslots on one of the carriers.

17 Claims, 3 Drawing Sheets

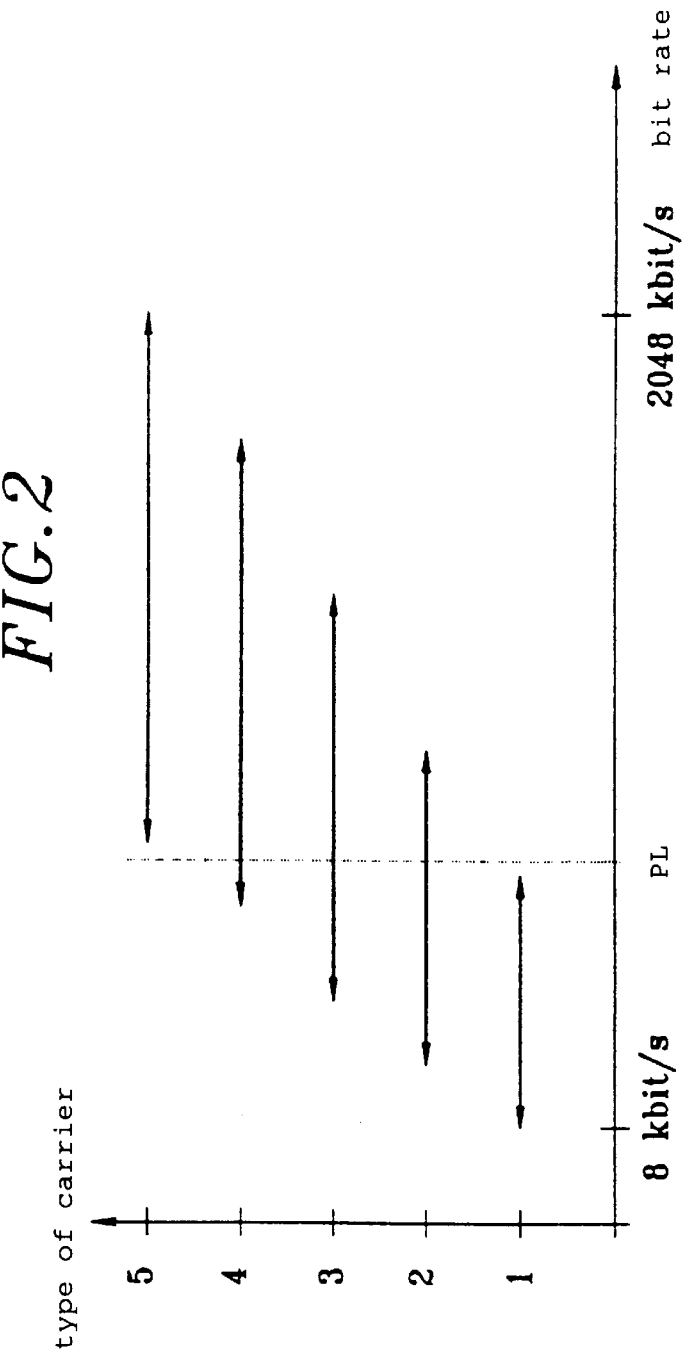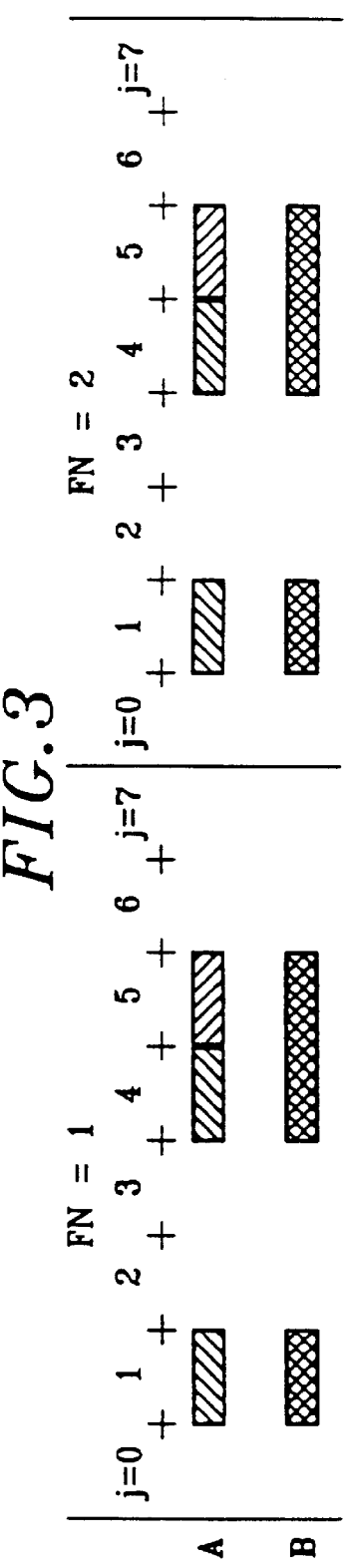

MULTIPLE ACCESS METHOD IN A CELLULAR RADIO COMMUNICATION NETWORK

BACKGROUND OF THE INVENTION

The present invention relates to cellular radio communication networks allowing communications at various bit rates.

The mechanism of multiple access of mobile stations in such a network is one of the key points in the design of the network.

The present invention relates more particularly to a time division multiple access (TDMA) method.

TDMA systems are used in a number of existing cellular networks, especially those constructed according to the GSM standards designed for essentially fixed communication bit rates. The third-generation mobile radio systems, such as UMTS (Universal Mobile Telecommunication System) will have to support a wide range of services, with bit rates varying from 8 kbit/s to 2 Mbit/s. TDMA systems comparable to those used in GSM have been proposed in order to offer these services and fulfil the objectives of UMTS whilst ensuring some degree of compatibility with the existing GSM infrastructures (see Tero Ojanpera et al, "Comparison of Multiple Access Schemes for UMTS", Proc. of the VTC'97 Conference, Phoenix, May 1997, Vol. 2, pages 490–495).

These proposals generally consider a definition of the radio interface matched to the cellular environment (indoor, outdoor propagation, microcells, macrocells etc.), but not to the type of service to be supported. Thus, for a given cellular environment, it is proposed to use a single bandwidth, the construction of channels with different bit rates resulting only from the allocation of a variable number of elementary timeslots per signal frame. This approach prevents optimization of the spectral resources as a function of the service bit rate, the structure being suitable for one type of bit rate only.

European patent application 0 719 062 discloses a radio communication system in which the used frequency band is divided into "channels", wherein each channel itself may be subdivided into a number of frequency "conduits". In order to allocate radio resource to a certain communication or to a certain service, there is provided either a time splitting of the "conduit" (TDM scheme) or a logic splitting by means of codes (CDMA scheme).

Another time and frequency mapping of the available radio resources is disclosed in European patent application 0 680 168.

A primary object of the present invention is to define a TDMA radio interface structure suitable for supporting a wide range of service bit rates. Another object is that this structure be flexible to use by the operator of the cellular network. It is also desired that this structure be compatible with radio resource optimization mechanisms, such as dynamic channel allocation (DCA) and/or frequency hopping.

SUMMARY OF THE INVENTION

The invention thus proposes a method of multiple access in a cellular radio communication network, the network allowing communications at different bit rates, with signals transmitted in successive frames each divided into elementary timeslots which can be used for different communications, wherein a frequency band is allocated to communications between base stations of a group of cells and mobile stations. The allocated frequency band is subdivided into frequency blocks each having a block width equal to $2^{M-1} \times B_0$ where $B_0$ is a predefined elementary spectral width and M an integer greater than 1 chosen as a function of a specified maximum communication bit rate for the group of cells. Each of the blocks is divided into a number $2^{M-m(i)}$ of carriers of spectral width $2^{m(i)-1} \times B_0$, $m(i)$ being an integer dependent on the relevant block such that $1 \leq m(i) \leq M$ and representing a type of carrier. The apportioning of the blocks and of the carriers within the allocated frequency band is identical for all the cells of the group. In order to support a communication in one of the cells, a logic channel is selected, defined, depending on the bit rate of said communication, as one or more elementary timeslots on one of the carriers.

With each request for a logic channel for a given communication bit rate, the operator can then define the widths of carriers best suited to supporting the communication, and preferentially allocate logic channels on such carriers. In general, it will be judicious to favour the allocation on narrow carriers.

The group of cells to which the method is applied can correspond to a geographical zone covered by the network. Advantageously, it may also correspond to a layer of cells in a multicellular type of network. In a multicellular network, the same geographical zone is covered by several layers of cells, the various layers corresponding to cells of different sizes. The smallest cells, or "microcells" are provided for communications with mobiles travelling at low or zero speed, whilst the "macrocells" are rather provided for mobiles travelling rapidly and in order to relieve the traffic from the microcells. Within the framework of the method according to the invention, the relevant frequency band is advantageously that allocated to one of the layers of the network, the other layers possibly having a similar or different spectral splitting mechanism.

The multiband structure used leads to the allocated frequency band being sliced up into blocks each containing carriers of homogeneous width. This strategy makes it possible to group together the services with equivalent bit rate into the same part of the band, so as to facilitate the obtaining of resources for the services at high bit rate.

The widest carrier is chosen at the level of the access network as a function of the cellular environment and of the maximum service bit rate to be supported. Advantageously, this choice can be modified dynamically, for example according to the time of day as a function of the traffic statistics. The slicing of each block into carriers can also be modified dynamically, if the distribution of the bit rates required varies over a day, or according to the day of the week etc. For example, it is possible to imagine that the services with the highest bit rate, which are supported by the widest carriers, might be prohibited at times of maximum traffic.

The multiple access method according to the invention is entirely compatible with the allocating of multiple timeslots of one and the same frame for one and the same logic channel. It also permits the concatenating of consecutive elementary timeslots on the same carrier so as to form physical channels which afford a higher communication bit rate than the sum of the bit rates afforded individually by these consecutive elementary timeslots.

The method also makes it possible to utilize a DCA mechanism. The following steps are then executed for each cell of the group:

assigning a priority to each carrier/timeslot pair as a function of qualities observed during communications within saidcell; and for each communication bit rate, selecting the logic channels on the basis of said priority values.

Preferably, the selecting of a logic channel then comprises the steps of:

obtaining an ordered list of configurations of logic channels capable of supporting the bit rate of the communication, each logic channel configuration being defined by a type of carrier and by at least one number of timeslots within the frames;

searching for an available logic channel having the first configuration of the list and fulfilling a specified priority condition; and if the preceding search yields a logic channel, selecting such logic channel for the communication, otherwise repeating the search for the next configuration of logic channel in the list.

The operator has a wide choice for defining the ordered lists of configuration of logic channels for each value of communication bit rate. Typically, the list will be ordered in such a way as to favour the least wide types of carriers, and to favour the concatenating of consecutive timeslots for the types of carriers where such a concatenation is permitted.

Another advantageous embodiment of the method employs frequency hopping from carrier to carrier within each set of carriers of the same type. It is in particular possible to provide for a frequency hopping from block to block within the allocated frequency band, with identical hopping sequences for all the cells of the group.

Frequency diversity is thus obtained which makes it possible to combat the channel fading due to the multiple propagation paths, whilst preserving the homogeneity of the blockwise slicing within the group of cells. It is also possible to remain compatible with the DCA mechanism.

To obtain a diversity of jammers from cell to cell, it is possible to further provide for a frequency hopping from carrier to carrier within each block with different hopping sequences from one cell of the group to another. This frequency hopping from carrier to carrier may in particular be performed within each block. Alternatively, the frequency hopping from carrier to carrier within each block may be performed with hopping sequences which are identical for all the cells of the group. In the latter case, no diversity of jammers is obtained, but greater frequency diversity is obtained whilst remaining compatible with the DCA mechanism.

The frequency hopping may be carried out at the rate of the signal frames. It may also be carried out at a higher rate, but this limits the possibilities of concatenating elementary timeslots.

BRIEF DESCRIPTION OF THE DRAWINGS

FIG. 2 is a chart showing the bit rates which can be supported by the various types of carrier.

FIG. 3 is a diagram illustrating the structure of the signal frames in a method according to the invention.

DESCRIPTION OF PREFERRED EMBODIMENTS

Figure 1:
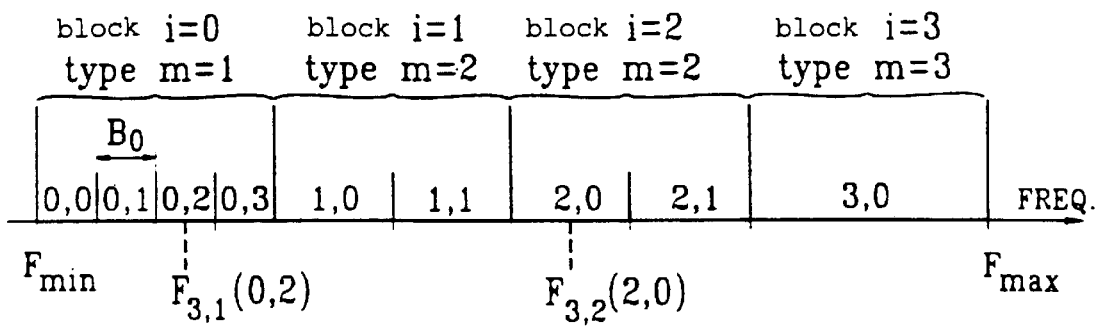
FIG. 1 is a diagram illustrating, according to the invention, the splitting of the frequency band allocated to a group of cells.

FIG. 1 shows a frequency band $F_{min}$-$F_{max}$ allocated to a group of cells of a radio communication network. This group consists for example of a layer of microcells of a multicellular network or of an adjoining subset of microcells of such a layer. The band $F_{min}$-$F_{max}$ is a part of the spectral resources available to the operator of the network, other parts consisting of the bands allocated to other layers. The band $F_{min}$-$F_{max}$ relates to a single direction of communication, e.g. the downlink direction, from the base stations to the mobile stations. The other direction of communication employs channels having a fixed frequency shift with respect to those used in the downlink direction. Such frequency division duplex (FDD) mode is frequently used in radio networks, for example in GSM. It is sufficient to allocate a channel for one direction of communication in order for the two stations to know which channels to use in the two directions.

The frequency band $F_{min}$-$F_{max}$ is used to define channels dedicated to communications between the base stations and the mobile stations (traffic and dedicated signalling channels). Frequency spans outside the band $F_{min}$-$F_{max}$ are used to form the common signalling channels (of the BCCH or CCCH type, etc.), which are channels which use a narrow bandwidth, of for example 200 kHz.

An elementary spectral width $B_0$ serving for the splitting of the spectrum is defined for the cellular network. This elementary width $B_0$ is for example 200 kHz so as to be compatible with the existing GSM systems.

The cellular network to which the invention is applied is designed for communications at various bit rates. In order to adopt carriers of a width which is suited to the communication bit rate, the frequency band $F_{min}$-$F_{max}$ is subdivided into carriers whose widths are multiples of $B_0$. More precisely, the carrier widths used are of the form $2^{x-1} \times B_0$. A carrier of width $2^{m-1} \times B_0$ is hereafter referred to as a carrier of type m (m≧1).

FIG. 2 shows an example of the digital communication bit rate ranges which may be supported by various types of carrier. The total bit rate span considered is from 8 to 2048 kbit/s. Of course, the wider the carrier, the more it accepts high bit rates.

The bit rate range supported by each type of carrier is relatively wide since a communication with a given bit rate may be performed over a logic channel formed by one or more timeslots on the same carrier.

The TDMA temporal structure of the signals is illustrated in FIG. 3. The radio signal is constructed by successive frames numbered FN=1,2, ... Each frame is subdivided into a number J of successive elementary timeslots numbered from j=0 to j=J−1 (J=8 in the example in FIG. 3).

In the example considered below, the timeslot j=0 is not used over the frequency band $F_{min}$-$F_{max}$. This timeslot j=0 is used to receive or transmit on the common channels BCCH or CCCH. Only the timeslots j=1 to j=J−1 can be allotted to dedicated channels. The line A of FIG. 3 thus illustrates the case of a dedicated logic channel consisting of timeslots j=1, 4 and 5 on the same carrier.

The operator of the cellular network defines the widest carrier used in the band $F_{min}$-$F_{max}$ as a function of the maximum communication bit rate provided for within the group of cells. M denotes the type of this widest carrier, the width of which is therefore $2^{M-1} \times B_0$.

The band $F_{min}$-$F_{max}$ is divided into I blocks of width $2^{M-1} \times B_0$, which are numbered from i=0 to i=I−1 (see FIG. 1, where M=3 and I=4).

In each block i are found exclusively carriers of the type m(i). There are $N(i)=2^{M-m(i)}$ of these carriers of type m(i) in block i, with $0 \leq i < I$, their spectral width being $2^{m(i)-1} \times B_0$. As FIG. 1 illustrates, each carrier of type m ($1 \leq m < M$) is designated by two integer references i,n, where i is the block number which includes this carrier ($0 \leq i < I$ and m(i)=m) and n is the number of the carrier within block i ($0 \leq n < N = 2^{M-m}$). The central frequency $F_{M,m}$ (i,n) of this carrier i,n is given by:

$$F_{M,m}(i,n)=F_{min}+[i \times 2^{M-1}+(n+\tfrac{1}{2}) \times 2^{m-1}] \times B_0 \quad (1)$$

The method according to the invention can be used with various types of modulations about these central frequencies. The various types of modulation commonly used in cellular networks (GMSK, QPSK, OFDM etc.) can thus be used.

The splitting of the band $F_{min}$-$F_{max}$ is the same for all the cells of the group, i.e. the numbers I, M, m(0), m(1), ..., m(I-1) are identical over the whole group of cells. This arrangement makes it possible to ensure availability of service over the whole of the zone covered and facilitates the grouping together of services with the same bit rate on the same portion of the spectrum. A high bit rate communication is thus prevented from suddenly disturbing low bit rate communications in neighbouring cells.

The splitting of the band $F_{min}$-$F_{max}$ and the TDMA structure lead to the defining of the concept of a physical channel. There are various types of physical channels depending on the width of the carrier and the possibilities for concatenating TDMA timeslots. Consideration will firstly be given to the case in which only simple physical channels are provided for, without concatenation of timeslots. The possibilities for concatenation will be examined later.

A physical channel of type m ($1 \leq m \leq M$) is designated by a triple i,n,j with $0 \leq i < I$, m(i)=m, $0 \leq n < N = 2^{M-m}$, $1 \leq j < J-1$, and corresponds to timeslot j on carrier n of block i.

A logic channel which can be allocated to a communication consists of one or more physical channels of the same carrier.

Figure 4:
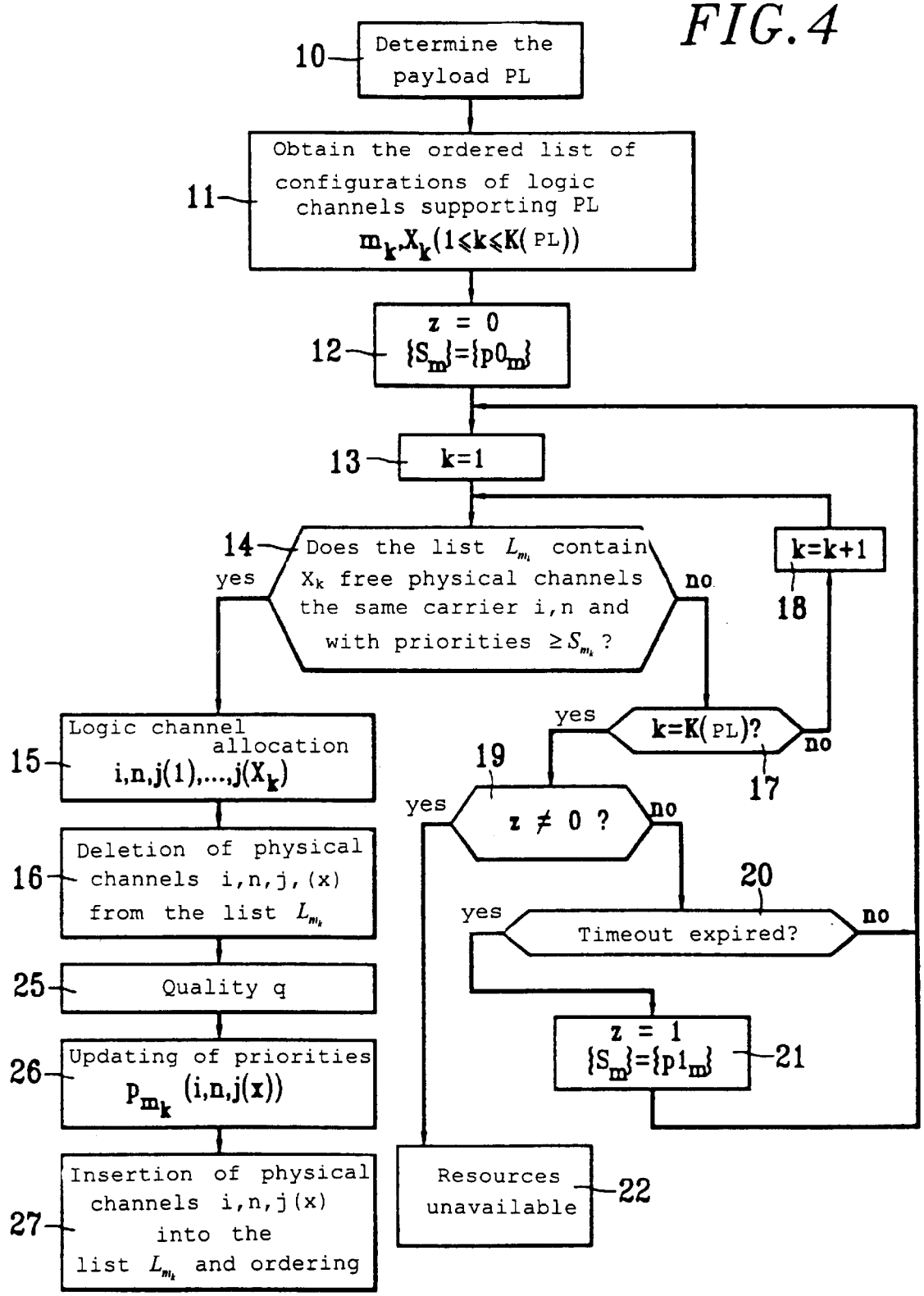
FIG. 4 is a flow chart of a channel allocation procedure which can be used according to the invention.

A technique for allocating the channels which can be used advantageously in a method according to the invention is illustrated by FIG. 4.

The infrastructure of the network manages the physical channels by assigning, for each cell, a priority $p_m(i,n,j)$ to each physical channel i,n,j of type m. For each type of carrier m, an acceptance threshold $p0_m$ is defined. In general, physical channels whose priority $p_m$ (i,n,j) is greater than or equal to the threshold $p0_m$ will, where possible, be allocated to the communications. The values of the thresholds $P0_m$ depend on the mode of calculating the priorities; they may be independent of the type of carrier.

For each cell and each type m of physical channel, the infrastructure of the network holds a list $L_m$ of free physical channels i,n,j ranked in order of decreasing priorities $p_m(i,n,j)$.

Management of the priorities $P_m$ and of the lists $L_m$ is carried out in the base station subsystem (BSS) of the network, and especially in the base station controllers (BSC).

Upon a request to set up a logic channel, the payload PL required by the type of service requested is determined (step 10 in FIG. 4). This payload PL is expressed in kbit/s. It may depend on the radio propagation environment if there is provision for error correcting coding whose coding rate depends on such environment.

As a function of this payload PL, the BSC supervising the relevant cell obtains, in step 11, an ordered list of configurations of logic channels capable of supporting this payload. A logic channel configuration is defined here by a type of carrier m ($1 \leq m \leq M$) and by a number X corresponding to a number of elementary timeslots ($1 \leq X < J$)

As FIG. 2 shows, it is generally possible for several types of carriers, and hence several configurations of logic channels, to be capable of supporting a given payload. The operator has the choice of ordering the list of these configurations of logic channels, there being K(PL) of them. In general, it will be to his advantage to favour the allocation of channels on a narrow carrier, so that the configurations of logic channels of the list will be ordered in order of increasing carrier types $m_k$.

For each configuration of logic channel $m_k, X_k$ ($1 \leq k \leq K$ (PL)), the number $X_k$ is the integer equal to or immediately greater than the ratio of the payload requested PL to the maximum payload which can be supported by an elementary timeslot on a carrier of type $m_k$.

The ordered list of configurations of logic channels can be obtained in step 11 by a memory read of a preset list. It can also be recalculated by the BSC if the ordering criteria defined by the operator are simple.

In step 12, variables $S_m$ are respectively taken to be equal to the thresholds $p0_m$ for the various types of carriers, and the indicator z is set to 0. The loop for searching for available logic channels then begins in step 13 by initializing the index k to 1.

In step 14, the BSC searches for a logic channel of configuration $m_k, X_k$ which would be available to support the communication. Stated otherwise, the BSC consults the list $L_{m_k}$ relating to the relevant cell, so as to determine whether it contains, on the same carrier i,n, $X_k$ free physical channels, i.e. $X_k$ different elementary timeslots j(1), ..., j($X_k$) in which the base station of the cell is not communicating on the carrier i,n. This search for channels 14 is accompanied by a condition on the priorities. This condition is that the priority of each of the $X_k$ free physical channels must be at least equal to the threshold variable $S_{m_k}$.

When the search 14 yields a result, the BSC is capable of allocating a logic channel for the communication to be set up. This logic channel consists of the $X_k$ physical channels found in the list $L_{m_k}$ during the search 14, i.e. of the $X_k$ elementary timeslots j(1), ..., j($X_k$) on the carrier i,n of type $m_k$. Of course, it is also necessary for all the transceiver units of the base station of the cell not to already be transmitting on one of the timeslots j(x) ($1 \leq x \leq X_k$). Otherwise, the logic channel is inaccessible.

The logic channel found in step 14 is allocated to the communication during step 15, and this allocation is notified to the mobile station. The list $L_{m_k}$ is next updated in step 16, by deleting therefrom the physical channels i,n,j(x) constituting the logic channel which has just been allocated.

When the search 14 is fruitless, the index k is compared with K(PL) in step 17. If k<K(PL), the index k is incremented by one unit in step 18, and then the BSC repeats the search step 14.

When comparison 17 shows that k=K(PL), the search loop has not enabled the BSC to find an available logic channel satisfying the priority condition relating to the thresholds $S_m$. The indicator z is then compared with 0 in step 19. If z=0, the BSC examines whether a specified timeout duration has elapsed since the start of the search for a logic channel (step 20). If this timeout has not expired, the BSC returns to step 13 to conduct a new search loop.

When the timeout has expired, the BSC modifies the priority condition in step 21 so as to be less restrictive with regard to the allocatable channels. In this step 21, the BSC sets the indicator z to 1 for example and decreases the values of the threshold variables $S_m$. Each variable $S_m$ is taken to be equal to another threshold $p1_m$, with $p1_m<p0_m$ (for example $p1^m=0$). After step 21, the BSC returns to step 13 to execute a new search loop with the less restrictive priority condition.

If this new search loop also fails (step 19 is reached with $z\neq0$), the BSC informs the entity from which the request originated of the unavailability of radio resources capable of meeting this request (step 22).

Once a logic channel has been allocated, the BSC manages this channel on the basis of radio measurements performed periodically in the uplink and downlink directions over this channel. In GSM type networks, such radio measurements are already used in the radio link management, in particular for triggering handovers.

The BSC thus determines, in step 25, a quality q of the communication taking place on the allocated logic channel. By way of example, the case in which this quality q is calculated from the parameters measured in accordance with the GSM standards is considered here. These measurements are performed with a periodicity of 480 ms.

For each direction of communication, the parameter RXLEV is the average of the field strengths of the signal samples received over the period of 480 ms. Each value of RXLEV is coded by decibels on six bits, the value RXLEV=0 corresponding to a power lower than −110 dBm, and the value RXLEV=63 corresponding to a power greater than 48 dBm. For each direction of communication, the quality parameter RXQUAL is deduced from the error rates of the bits received over the channel over the 480 ms period, estimated from the metric used in the Viterbi channel equalizer and/or in the Viterbi convolutional decoder. Each value of RXQUAL is coded from 0 to 7 depending on the intervals of value in which the observed binary error rate falls (0%–0.2%/0.2%–0.4%/0.4%–0.8%/0.8%–1.6%/1.6%–3.2%/3.2%–6.4%/6.4%–12.8%/12.8%–100% respectively).

The downlink measurements performed by the mobile station are included within a message called MEASUREMENT_REPORT in GSM terminology. For the radio link management procedures, the base station transmits these measurements to its BSC in a message called MEASUREMENT_RESULT, in which it additionally includes the uplink measurements which it has performed. These measurements are processed at the level of the BSC which carries out the radio link management functions for. For further details, reference may be made to GSM Recommendation 05.08 (Draft pr ETS 300 578, 2nd edition, March 1995, ETSI).

By way of example, the quality q can be calculated, after receiving each pair RXLEV,RXQUAL relating to a period of 480 ms, through a combination such as:

$$q=\alpha_L \times RXLEV + \alpha_Q \times RXQUAL \quad (2)$$

where $\alpha_L$ and $\alpha_Q$ are two positive weighting coefficients (for example $\alpha_L=1/63$, $\alpha_Q=1/7$).

In step 26, which is for example executed after calculating each quality value q, the BSC updates the priorities $p_m(i,n,j)$ of the physical channels i,n,j belonging to the logic channel on which the communication is taking place. The exponents (t) referring to the $t^{th}$ period of 480 ms during the communication, the updating is performed for example as follows:

$$p_{m_k}^{(t)}(i,n,j(x))=\beta \times p_{m_k}^{(t-1)}(i,n,j(x))+(1-\beta)\times q^{(t)} \quad (3)$$

for each physical channel i,n,j(x) concerned ($1 \leq x \leq X_k$), with $0<\beta<1$. The quantity $T_0=-(480\ ms)/\ln\beta$ represents the length of the averaging window, and can be chosen to be of the order of a few seconds.

When the logic channel is finally freed, the BSC reinserts the physical channels i,n,j(x) into the list $L_{m_k}$ held for the relevant cell, and reorders this list in order of decreasing priorities (step 27).

As indicated earlier, it is possible, within the framework of the invention, to concatenate consecutive elementary timeslots on the same carrier so as to form combined timeslots which, on the carrier in question, afford a higher communication bit rate than the sum of the individual bit rates afforded by these consecutive elementary timeslots. Thus, in the diagram of FIG. 3, the concatenating of the timeslots j=4 and j=5 on the same carrier (line B) makes it possible to support a larger bit rate than the allocating of the same two timeslots without concatenation (line A). The reason for this is that, on the one hand, concatenation generally makes it possible to use fewer synchronization bits, and hence more information bits over the same duration, and on the other hand that it is no longer necessary to provide for a guard period between the concatenated timeslots in order to take into account the various durations of propagation depending on the distance between the mobile station and the base station.

Thus, the allocating of a logic channel such as that represented in line B of FIG. 3 does not consume more radio resources than the allocating of a logic channel according to line A, and permits a higher communication bit rate.

When the possibility of concatenating the elementary timeslots is provided for, there is cause to consider more types of physical channels. A physical channel is still defined by a carrier and a timeslot on this carrier, but this timeslot may be simple, double, triple etc. The type m,h of the physical channel is then defined by the type m of its carrier and by the number h of elementary timeslots of which it consists (h>1).

In practice, the number of elementary timeslots which can be concatenated is limited: $1 \leq h \leq H(m)$, where $H(m)<J$ is a predefined number which may or may not be dependent on the type of carrier m, for example H(m)=3.

When concatenation is provided for, the DCA mechanism is modified whilst nevertheless remaining based on the same principle as before. For each cell, the BSC holds a list of free physical channels in relation to each type of physical channel m,h. A logic channel configuration is then defined as a type of carrier m ($1 \leq m \leq M$) and by H(m) numbers $X_h$, each number $X_h$ ($1 \leq h \leq H(m)$) being a number of timeslots formed from h elementary timeslots, which are consecutive and concatenated if h>1 ($1 \leq X_h<J/h$). For example, the logic channel represented in line B of FIG. 3 has configuration m,1,1,0 (the case where H(m)=3), given that it is composed of $X_1=1$ simple elementary timeslot (j=1), of $X_2=1$ double timeslot (j=4 and 5), and of $X_3=0$ triple timeslot.

In a manner similar to the case of FIG. 4, the operator can define ordered lists of configurations of logic channels for the various payload ranges. During the search for an available logic channel having a given configuration, there is cause to consult several lists of free physical channels if this configuration is mixed, i.e. does not comprise only physical channels of the same type. Step 16 for updating the lists of free physical channels after the allocation of a logic channel is likewise modified. Indeed, all the physical channels which share, on the same carrier, at least one elementary timeslot with the logic channel just allocated should be deleted from the lists of free channels. These physical channels will be reintroduced into the lists of free channels in step 27, once their respective priorities have been updated on the basis of the qualities measured. This updating is performed as follows:

the priorities of the physical channels making up the logic channel on which the quality q is measured (i.e. of the simple physical channel j=1 and of the double physical channel j=4-5 in the case of the logic channel illustrated in line B of FIG. 3) are updated in the same way as described earlier, via a formula similar to formula (3);

when the logic channel is freed, and if this logic channel includes at least one physical channel of h≧2 concatenated consecutive elementary timeslots, the new value of the priority of this physical channel is assigned to the priority of each simple physical channel formed by one of these consecutive elementary timeslots on the same carrier (i.e. simple physical channels j=4 and j=5 in the case of the logic channel of line B of FIG. 3); and when the logic channel is freed, the priority of each physical channel formed from h>2 consecutive elementary timeslots on the same carrier and sharing at least one elementary timeslot with the logic channel is obtained via a specified combination of the priorities of the h simple physical channels formed respectively by these h elementary timeslots on the carrier. This combination is for example an arithmetic average of the h priorities in question. It could also be a weighted average. Thus, each physical channel sharing at least one elementary timeslot on the same carrier with the logic channel just freed has its priority updated, and can be reintroduced into the lists of free channels in step 27.

As indicated earlier, the integer M (and hence the integer I) and/or the integers m(i) are parameters which the operator can modify dynamically. He can thus match the division of his radio resources to various traffic conditions. Such a matching may be performed according to the time of day and/or the day of the week.

Such a modification of the integer M and/or the integers m(i) entails calculating the priorities for the new partition of the spectrum as a function of the priorities in force within the old partition. The BSC then assigns each physical channel (carrier/simple or concatenated timeslot pair) a new priority determined as follows:

if the carrier has a width included within the width of another carrier of the previous partition, the priority of the new physical channel is taken to be equal to that of the physical channel formed by said other carrier and said timeslot; and if the carrier has a width covering the widths of several other carriers of the previous partition, the priority of the new physical channel is taken to be equal to an average of the priorities of the physical channels formed respectively by said other carriers and said timeslot. This average may simply be an arithmetic average. It could also be a weighted average.

After calculating these new priorities, the dynamic allocation of the channels can be performed in the manner described earlier.

An advantageous implementation of a frequency hopping mechanism in a multiple access method according to the invention will now be described.

The above formula (1) gives the central frequency of a carrier i,n of the type m in the absence of frequency hopping. Frequency hopping then consists in permuting the carrier indices i,n in such a way that a carrier used for one or more communications always keeps the same type. This permuting modifies the formula (1) as follows:

$$F_{M,m}(i,n)=F_{min}+[i'\times 2^{M-1}+(n'+\frac{1}{2})\times 2^{m-1}]\times B_0 \quad (1')$$

namely the indices i,n are replaced by indices i',n' calculated by random permutations of i and n.

The frequency hops are preferably performed between two successive frames. The permutations may in particular be performed at the rate of the signal frames, in which case the hopping rate is the same as that of the frames. The period between two hops could also be smaller (one or several elementary timeslots), this having the consequence of limiting the possibilities of concatenating timeslots.

In order to preserve the uniformity of the apportioning of the types of carriers over the various cells of the group, a frequency hopping from block to block is carried out, with identical hopping sequences for all the cells of the group. The permuted block index i' is then independent of n. An example of a possible permutation is:

$$i'=[i+R_I(HSN,MAIO,FN)] \mod I \quad (4)$$

where:

$R_a(x,y,z)$ denotes a function which generates a random integer number in the interval [0,a[ depending on the value of its three arguments x,y,z, such as the function used in the frequency hopping scheme of GSM systems, described in GSM Recommendation 05.02 of the ETSI (here, the term "random" is understood to mean that the distribution of the values of the function is uniform over the integers 0,1, . . . ,a−1);

I is the number of blocks;

HSN and MAIO are two parameters of the random generator, which are ascribed in common to all the cells of the group so that the hopping sequences are the same for all the cells;

FN is the frame number. In the GSM systems, this number FN is in the interval [0, 2715647], and is defined by 19 bits which the base station transmits to the mobile stations which it serves on a synchronization channel (SCH) included within the common BCCH channel (see GSM Recommendation 05.02).

The frequency hopping defined by formula (4) affords frequency diversity. It is compatible with the DCA mechanism described earlier.

To supplement the hopping from block to block, it is advantageous to provide for frequency hopping from carrier to carrier within each. block. After permutation, the carrier i,n of type m(i)=m is then in a position i',n' with, for example, i' given by formula (4) and n' by:

$$n'=[n+R_N(HSN_C,MAIO_C,FN] \mod N \quad (5)$$

where:

$N=2^{M-m}$ is the number of carriers of the block;

$HSN_C$ and $MAIO_C$ are two parameters of the random generator. $HSN_C$ and $MAIO_C$ may be independent of the cell concerned. In this case, the hopping according to formula (5) enhances the frequency diversity and makes it possible to remain compatible with the DCA mechanism.

Alternatively, the parameters $HSN_C$ and $MAIO_C$ and hence the hopping sequences, may be different from one cell of the group to another. In the latter case, the advantage of a diversity of jammers is obtained, especially in respect of the narrow channels which will a priori be used most, but the previously described DCA is no longer applicable.

Figure 5:
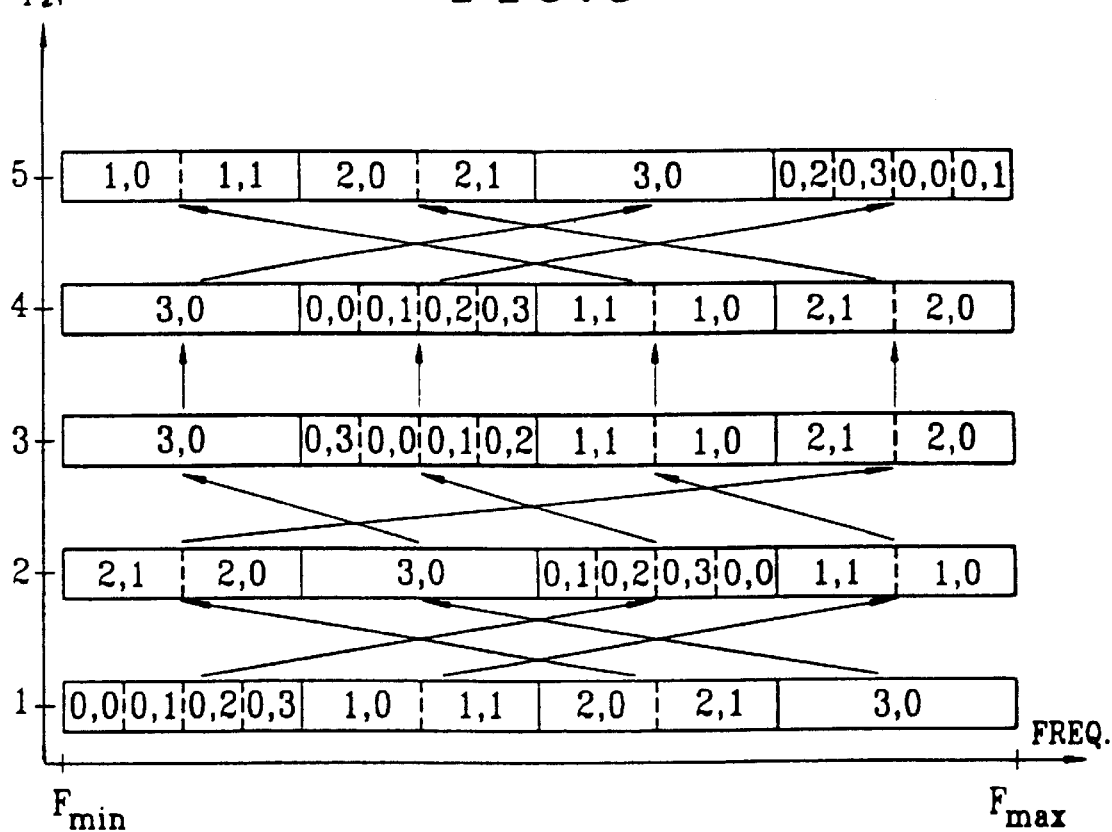
FIG. 5 is a diagram illustrating a frequency hopping procedure which can be used according to the invention.

FIG. 5 is an illustration of the hops performed by the carriers according to the partition of FIG. 1 (I=4, M=3, m(0)=1, m(1)=2, m(2)=2, m(3)=3) as a function of the frame number FN, in the particular case in which, for FN=1,2,3,4,5 respectively:

$R_4(HSN,MAIO,FN)=0,2,1,1,3$     (formula 4)

$R_3(HSN_C,MAIO_C,FN)=0,3,1,0,2$     (formula 5)

$R_2(HSN_C,MAIO_C,FN)=0,3,1,0,2$     (formula 5).

We claim:

1. A method of multiple access in a cellular radio communication network, the network allowing communications at different bit rates, with signals transmitted in successive frames each divided into elementary timeslots usable for different communications, comprising the steps of:

allocating a frequency band to communications between base stations of a group of cells and mobile stations, a first partitioning step, wherein the allocated frequency band is partitioned into frequency blocks each having a block width equal to $2^{M-1} \times Bo$ where Bo is a predefined elementary spectral width and M is an integer greater than 1 chosen as a function of a specified maximum communication bit rate for the group of cells, a second partitioning step, wherein each of the blocks is partitioned into a number $2^{M-m(i)}$ of carriers of spectral width $2^{m(i)-1} \times Bo$, m (1) being an integer dependent on the block such that 1<m(i)<M and representing a type of carrier, wherein the partition of the blocks and of the carriers within the allocated frequency band is identical for all the cells of the group, and selecting and defining a logic channel depending on the bit rate of a communication, as one or more elementary timeslots on one of the carriers, in order to support said communication in one of the cells.

2. Method according to claim 1, wherein the integer M and/or the integers m(i) are dynamically modifiable parameters.

3. A method according claim 2, wherein, for some of the logic channels defined as several elementary timeslots on a carrier, at least two of said elementary timeslots are consecutive and concatenated to form a combined timeslot which affords, on said carrier, a communication bit rate which is higher than the sum of the bit rates afforded individually by said consecutive elementary timeslots.

4. A method according to claim 1, comprising the following steps for each cell of the group:

assigning a priority value to each carrier/timeslot pair as a function of qualities observed during communications within said cell; and for each communication bit rate, selecting the logic channels on the basis of said priority values.

5. A method according to claim 4, wherein the selecting of a logic channel for a communication with a given bit rate comprises the steps of:

obtaining an ordered list of configurations of logic channels capable of supporting the bit rate of the communication, each logic channel configuration being defined by a type of carrier and by at least one number of timeslots within the frames;

searching for an available logic channel having the first configuration of the list and fulfilling a specified priority condition; and if the preceding search yields a logic channel, selecting said logic channel for the communication, otherwise repeating the search for the next logic channel configuration in the list.

6. A method according to claim 5, wherein, if said searches for logic channels do not yield any logic channel after a specified timeout duration, other searches for logic channels are conducted in the order of the configurations of the list, using a less restrictive priority condition.

7. A method according to claim 5, wherein each logic channel configuration is defined by a type of carrier and by H(m) numbers of timeslots within the frames, H(m) being an integer at least equal to 1, the h-th of said H(m) numbers ($1 \leq h \leq H(m)$) corresponding to allottable timeslots formed from h elementary timeslots, which are consecutive and concatenated if h>1, and wherein each pair formed by a carrier of type m ($1 \leq m \leq M$) and by an allottable timeslot of h elementary timeslots ($1 \leq h \leq H(m)$) defines a physical channel to which a priority is assigned.

8. A method according to claim 7, wherein the integer H(m) depends on the type of carrier.

9. A method according to claim 7, wherein, following observations of quality of a communication over a logic channel which includes a physical channel of h>2 consecutive elementary timeslots on a carrier, a new priority value is assigned to said physical channel, and the same priority value is assigned to each physical channel formed by one of said elementary timeslots on said carrier.

10. A method according to claim 9, wherein the priority value of a physical channel formed from h>2 consecutive elementary timeslots on a carrier is obtained via a specified combination of the priority values of the h physical channels respectively formed by said h elementary timeslots on said carrier.

11. A method according to claim 4, wherein the integer M and/or the integers m(i) are dynamically modifiable parameters, and wherein, upon a modification of the integer M and/or of one at least of the integers m(i), a specified priority value is assigned to a new carrier/timeslot pair as follows:

if the carrier of said new carrier/timeslot pair has a width included within the width of another carrier of the previous partition, the priority value of the new carrier/timeslot pair is taken to be equal to the priority value of the pair which was formed by said other carrier and said timeslot;

if said carrier of said new carrier/timeslot pair has a width covering the widths of several other carriers of the previous partition, the priority value of the new carrier/timeslot pair is taken to be equal to an average of the priority values of the pairs which were formed respectively by said other carriers and said timeslot.

12. A method according to claim 1, wherein a frequency hopping from carrier to carrier is performed within each set of carriers of the same type.

13. A method according to claim 12, wherein the frequency hopping is performed between successive frames.

14. A method according to claim 12, wherein a frequency hopping from block to block is performed within the allocated frequency band, with identical hopping sequences for all the cells of the group.

15. A method according to claim 14, wherein a frequency hopping from carrier to carrier is further performed within each block.

16. A method according to claim 15, wherein said frequency hopping from carrier to carrier within each block is performed with different hopping sequences from one cell of the group to another.

17. A method according to claim 15, wherein said frequency hopping from carrier to carrier within each block is performed with hopping sequences which are identical from one cell of the group to another.

* * * * *